(12) United States Patent
Chino et al.

(10) Patent No.: US 8,226,123 B2
(45) Date of Patent: Jul. 24, 2012

(54) FUEL TANK

(75) Inventors: Minoru Chino, Sagamihara (JP);
Naoaki Tanimura, Hiratsuka (JP);
Masashi Kamei, Yokohama (JP);
Junichi Hanai, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 459 days.

(21) Appl. No.: 12/237,829

(22) Filed: Sep. 25, 2008

(65) Prior Publication Data

US 2009/0085342 A1 Apr. 2, 2009

(30) Foreign Application Priority Data

Oct. 1, 2007 (JP) ................................. 2007-257707

(51) Int. Cl.
*B60P 3/22* (2006.01)
(52) U.S. Cl. ........... 280/830; 280/833; 280/7; 200/4.14; 200/746; 137/574; 137/142; 137/147; 137/587; 137/565.22
(58) Field of Classification Search .................. 280/830, 280/833, 7; 220/4.14, 746; 137/574, 142, 137/147, 587, 565.22
See application file for complete search history.

(56) References Cited

U.S. PATENT DOCUMENTS

| | | | | |
|---|---|---|---|---|
| 4,951,699 A | * | 8/1990 | Lipman | 137/142 |
| 5,983,932 A | * | 11/1999 | Wagner et al. | 137/587 |
| 6,276,387 B1 | * | 8/2001 | Pachciarz et al. | 137/43 |
| 6,520,200 B1 | * | 2/2003 | Lawrukovich et al. | 137/202 |
| 6,557,595 B2 | | 5/2003 | Ozaki | |
| 6,604,539 B1 | | 8/2003 | Strohmayer et al. | |
| 6,607,005 B2 | * | 8/2003 | Viebahn et al. | 137/574 |
| 6,655,403 B2 | * | 12/2003 | Mills | 137/2 |
| 6,712,234 B2 | * | 3/2004 | Boecker | 220/563 |
| 6,832,602 B2 | | 12/2004 | Tanimura | |
| 6,957,658 B2 | | 10/2005 | Aschoff et al. | |
| 7,069,914 B2 | * | 7/2006 | Nagata | 123/509 |
| 7,316,222 B2 | * | 1/2008 | Danjyo et al. | 123/509 |
| 2001/0013516 A1 | | 8/2001 | Boecker | |
| 2002/0148510 A1 | * | 10/2002 | Viebahn et al. | 137/574 |
| 2004/0256006 A1 | | 12/2004 | Aschoff et al. | |
| 2005/0211310 A1 | | 9/2005 | Aschoff et al. | |
| 2009/0194529 A1 | * | 8/2009 | Suda et al. | 220/4.14 |

FOREIGN PATENT DOCUMENTS

| | | |
|---|---|---|
| DE | 19956931 (A1) | 5/2001 |
| DE | 10227524 A1 | 1/2004 |
| DE | 10238237 A1 | 3/2004 |
| JP | 2001-341536 (A) | 12/2001 |
| JP | 2002-2314 (A) | 1/2002 |
| JP | 2003-512576 (A) | 4/2003 |
| JP | 2004-189074 A | 7/2004 |

* cited by examiner

*Primary Examiner* — Joanne Silbermann
*Assistant Examiner* — Marlon Arce
(74) *Attorney, Agent, or Firm* — Foley & Lardner LLP

(57) ABSTRACT

A fuel tank has a primary sump and secondary sump. A first vent valve and a second vent valve are disposed within the fuel tank. The first vent valve is closed when a level of fuel in the primary sump is equal to or higher than a first predetermined filling level, and the second vent valve is closed when a level of fuel in the secondary sump is equal to or higher than a second predetermined filling level in a refueling procedure.

14 Claims, 4 Drawing Sheets

FUEL TANK

This application claims the priority based on Japanese Patent Application No. 2007-257707 filed Oct. 1, 2007, the content of which is hereby incorporated by reference.

BACKGROUND OF THE INVENTION

1. Field of the Invention

The present invention relates to fuel tanks, and more particularly to automotive saddle fuel tanks. Still more particularly, the present invention relates to systems for controlling filling of a fuel tank in a refueling procedure.

2. Background Art

Automotive saddle fuel tanks have a tank shell defining a bottom. The tank shell is configured with a centrally disposed bight in the bottom thereof. The bight provides an exterior concavity which is intended to provide accommodation for drive and/or exhaust components of the vehicle to pass freely therethrough. While providing free space at the exterior of the fuel tank, the bight also provides a riser interior to the fuel tank, in turn providing two sumps, namely, a primary sump and a secondary sump. The two sumps conjoin in the space of the fuel tank higher than the height of the riser. One example of such saddle fuel tanks is disclosed in JP2004-189074A.

By virtue of their saddle configuration, such fuel tanks are used primarily in relation to rear wheel drive motor vehicles. The tanks can be appropriately arranged over drive components or over parts of the exhaust system of the vehicle. For that purpose, as indicated above, the fuel tank has a concavity extending upwardly into the tank.

When the vehicle in which the saddle fuel tank is fitted is in an inclined position or in different conditions of acceleration, particularly when the vehicle is subjected to transverse acceleration forces in bends of a road, it is quite possible for fuel to flow over the riser from one sump into the other sump, thereby resulting in different filling levels in the sumps.

It will further be noted that differences in level between the sumps can give rise to problems when refueling the motor vehicle, particularly when the fuel in one sump of the tank reaches a level at which a refueling vent valve provided therein responds, although the maximum filling level has not yet been reached in the other sump. In this case, the automatic shut-off valve in refueling gun shuts off prematurely in the refueling procedure, with the consequence that the tank cannot be completely filled. This problem can occur in particular if the riser provided in the tank is particularly pronounced and the refueling vent valve shut-off level is below the level of the top of the riser, so that equalization of the levels in the sumps by fuel flowing across one sump into the other sump through a compensating or equalizing line could occur only after the refueling vent valve has responded.

For the purposes of equalizing the filing levels in various sumps in a saddle fuel tank, it would be possible to intercommunicate various sumps of a saddle fuel tank by way of compensating tube or conduit. It will be noted however that this involves ensuring the same filling level in different volumes of the sumps of the tank, both when the motor vehicle is stationary and also when it is in operation, although that may not always be desirable.

As a comparable arrangement for the purposes of equalizing the levels of fuel in different volumes of various sumps of a saddle fuel tank, it would be possible to use a compensating line in the form of a siphon. The compensating line communicates by way of a branch with a vacuum chamber of a suction jet pump which is operated by the return flow of fuel from the engine back to the tank. This arrangement ensures that any air or gas which has accumulated in the compensating line can be removed so that equalization of the levels of fuel in the various sumps of the tank can take place irrespective of fuel being removed by suction from the compensating line.

This design is disadvantageous however insofar as an identical level of fuel in each of the sumps of the tank is guaranteed only if the vehicle is not transversely inclined. If the vehicle is transversely inclined when the tank is being refilled, it is still not possible to ensure that the automatic shut-off valve in the refueling gun shuts off when the level of fuel in the sumps is the same. Such a design configuration suffers from disadvantages in terms of refueling.

FIG. 1 is a sectional schematic view of a saddle fuel tank 10 having a tank shell 12. The tank shell 12 defines a bottom 14 and an oppositely disposed top 16. A bight 18 at the bottom 14 provides a concavity 20 exterior to the fuel tank 10 and a riser 22 interior to the fuel tank 10, in turn providing a primary sump 24 and a secondary sump 26.

A tank filer pipe 28 provides an entry for fuel into the fuel tank 10, wherein the primary sump 24 is identified as the sump first filled by fuel introduced from the filer pipe 28. Although not shown, at least one fuel extraction system is disposed in the fuel tank 10. Such fuel extraction system is known and can be found for example in U.S. Pat. No. 6,832,602 B2 (Tanimura) to which reference may be made for a more detailed description and the disclosure of which is hereby incorporated into this specification. Means for venting the fuel tank 10 are in the form of a single common refueling vent valve 30 for the primary and secondary sumps 24 and 26. The vent valve 30 is disposed in the secondary sump 26 in fluid connection with an outwardly extending vent conduit 32 that runs to a vapor storage canister, not shown. Fuel vapors are routinely vented to the canister from which they are later purged by engine manifold vacuum and burned.

Immediately after movements of the motor vehicle causing fuel to flow over from the primary sump 24 into the secondary sump 26 when the vehicle is subjected to transverse acceleration, it is quite possible that the fuel in the secondary sump 26 reaches a level at which the refueling vent valve 30 responds, but the fuel in the primary sump 24 drops to a level far below the maximum filling level as shown in FIG. 2. In this case, the automatic shut-off valve in the refueling gun shuts off in the refueling procedure. As a result, the fuel tank 10 cannot be completely filled.

SUMMARY OF THE INVENTION

An object of the present invention is to design a fuel tank in such a way that completely filling in a refueling procedure is ensured in any situations and also overfilling is reliably avoided.

According to one aspect of the present invention, there is provided a fuel tank comprising:

a tank shell having a bottom and a bight in the bottom, the bight providing a riser within the interior of the fuel tank, the riser creating a primary sump and a secondary sump, the primary and secondary sumps conjoining in a space of the fuel tank higher than the riser;

a first vent valve venting the fuel tank, the first vent valve being configured to be closed when a level of fuel in the primary sump is equal to or higher than a first predetermined filling level; and a second vent valve venting the fuel tank, the second vent valve being configured to be closed when a level of fuel in the secondary sump is equal to or higher than a second predetermined filling level.

According to another aspect of the present invention, there is provided a system for controlling filling of a fuel tank in a refueling procedure, the fuel tank having a primary sump, a secondary sump and a bottom configured to a plurality of levels, the system comprising:

a first refueling vent valve having an outlet, the first refueling vent valve being disposed within the fuel tank and configured to respond by taking a closed position when a level of fuel in the primary sump on a first of the plurality of levels of the bottom is equal to or higher than a first predetermined filling level;

a second refueling vent valve having an outlet, the second refueling vent valve being disposed within the fuel tank and configured to respond by taking a closed position when a level of fuel in the secondary sump on a second of the plurality of levels of the bottom is equal to or higher than a second predetermined filling level; and a conduit connecting the outlet of the first refueling vent valve and the outlet of the second refueling vent valve, the conduit passing over the highest of the plurality of levels of the bottom.

According to still another aspect of the present invention, there is provided a method of controlling filling of a fuel tank in a refueling procedure, the fuel tank having a primary sump, a secondary sump and a bottom configured to a plurality of levels, the method comprising:

disposing a first refueling vent valve, having an outlet, within the fuel tank to respond by taking a closed position when a level of fuel in the primary sump on a first of the plurality of levels of the bottom is equal to or higher than a first predetermined filling level;

disposing a second refueling vent valve, having an outlet, within the fuel tank to respond by taking a closed position when a level of fuel in the secondary sump on a second of the plurality of levels of the bottom is equal to or higher than a second predetermined filling level; and disposing a conduit connecting the outlet of the first refueling vent valve and the outlet of the second refueling vent valve over the highest of the plurality of levels of the bottom.

DETAILED DESCRIPTION OF THE INVENTION

Figure 1:
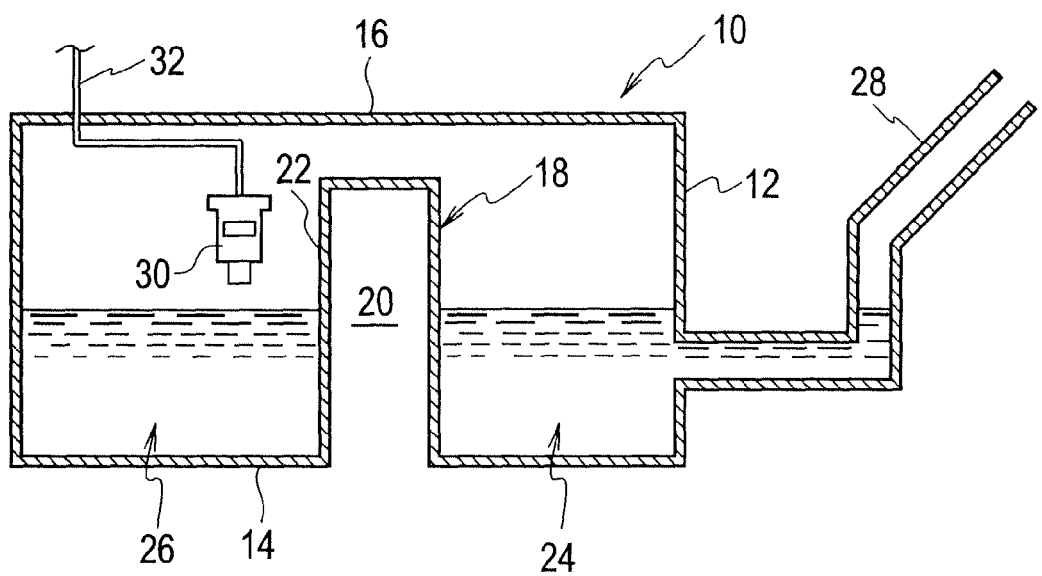
FIG. 1 is a schematic view of the before mentioned fuel tank.

Referring now to the drawings, FIGS. 3 through 7 depict a preferred embodiment according to the present invention.

Each of FIGS. 3 through 7 depicts a sectional schematic view of a saddle fuel tank 100 having a tank shell 102. The tank shell 102 defines a bottom 104 and an oppositely disposed top 106. A bight 108 at the bottom 104 provides a concavity 110 exterior to the fuel tank 100 and a riser 112 interior to the fuel tank 100, in turn providing a primary sump 114 and a secondary sump 116. The primary and secondary sump 114 and 116 conjoin in a space 117 higher than the top of the riser 112. The bottom 104 is configured to a plurality of different levels. The interior wall of the bottom 104 is formed in a first level 118, a second level 120 spaced from the first level 118 and a third or highest level 122. The third level 122 interconnects the first level 118 and the second level 120, forming the riser 112 between the first and second levels 118 and 120. The first and second levels 118 and 120 are at the same level and lower than the third level 122. It will be understood, however, that the first and second levels 118 and 120 may be at different levels. As illustrated the bottom 104 has a saddle-like configuration.

A tank filer pipe 128 provides an entry for fuel into the fuel tank 100, wherein the primary sump 114 is identified as the sump first filled by fuel introduced from the filer pipe 128. Although not shown, at least one fuel extraction system is disposed in the saddle fuel tank 100. Such fuel extraction system is known and can be found for example in U.S. Pat. No. 6,832,602 B2 (Tanimura) to which reference may be made for a more detailed description.

A first refueling vent valve 130 for the primary sump 114, which is preferably float operated, is disposed within the fuel tank 100, preferably in the primary sump 114 on the first level 118 of the bottom 104 and designed to respond by taking a fully closed position when a fuel level in the primary sump 114 is equal to or higher than a tank fill level or first predetermined filling level B2 that is lower than a maximum filling level B1 of the primary sump 114. The maximum filling level B1 of the primary sump 114 is set as high as the highest level 122 of the bottom 104.

A second refueling vent valve 132 for the secondary sump 116, which is preferably float operated, is disposed within the fuel tank 100, preferably on the secondary sump 116 on the second level 120 of the bottom 104 and designed to respond by taking a fully closed position when a fuel level in the secondary sump 116 is equal to or higher than a tank fill level or second predetermined filling level A2 that is lower than a maximum filling level A1 of the secondary sump 116. The maximum filling level A1 in the secondary sump 116 is set as high as the highest level 122 of the bottom 104.

The first refueling vent valve 130 has an outlet 134 that is connected through a conduit or hose 136 to an outwardly extending conduit 138. The conduit 136 is disposed over the top of the riser 112 or the highest level 122 of the bottom 104. The outwardly extending conduit 138 is connected to the inlet of a storage canister 140. The storage canister 140 has an outlet conduit 142 adapted for connection to the air inlet of an engine. The storage canister 140 typically has an atmospheric air inlet 144 for providing atmospheric purge air flow through the canister 140. The second refueling vent valve 132 has an outlet 146 that is connected through a part of the conduit 136 to the outwardly extending conduit 138.

In the illustrated embodiment, the maximum filling level A1 of the primary sump 114, the maximum filling level B1 of the secondary sump 116 and the highest level 122 of the bottom 104 are the same level. It will be noted however that the maximum filling levels A1 and B1 may be at different levels. With respect to volumes of the primary and secondary sumps 114 and 116, the volumes may be the same or different.

Figure 5:
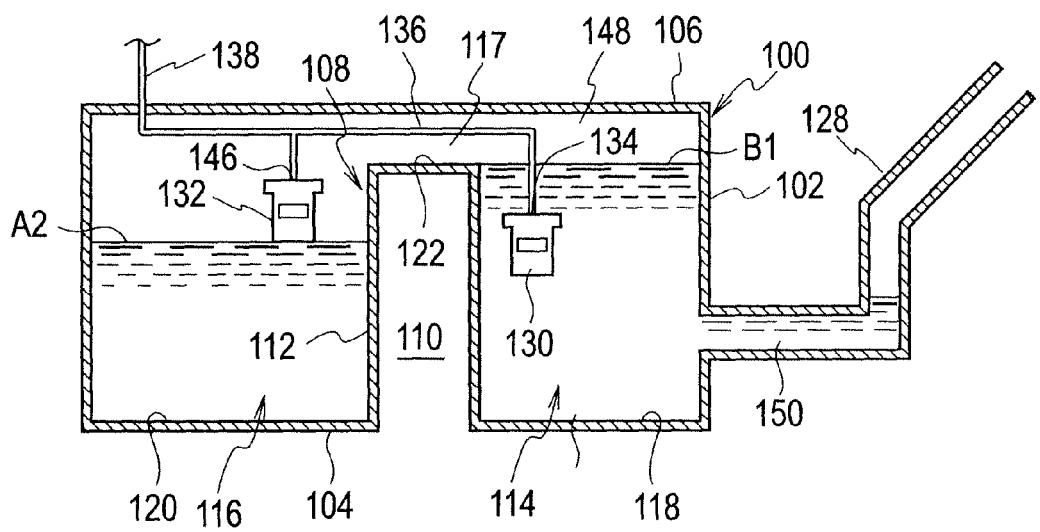
FIG. 5 shows the fuel tank is filled, in which the filling level at which the refueling vent valve in the secondary sump is closed has been reached in a refueling procedure, causing the shut-down of the refueling procedure.
Figure 7:
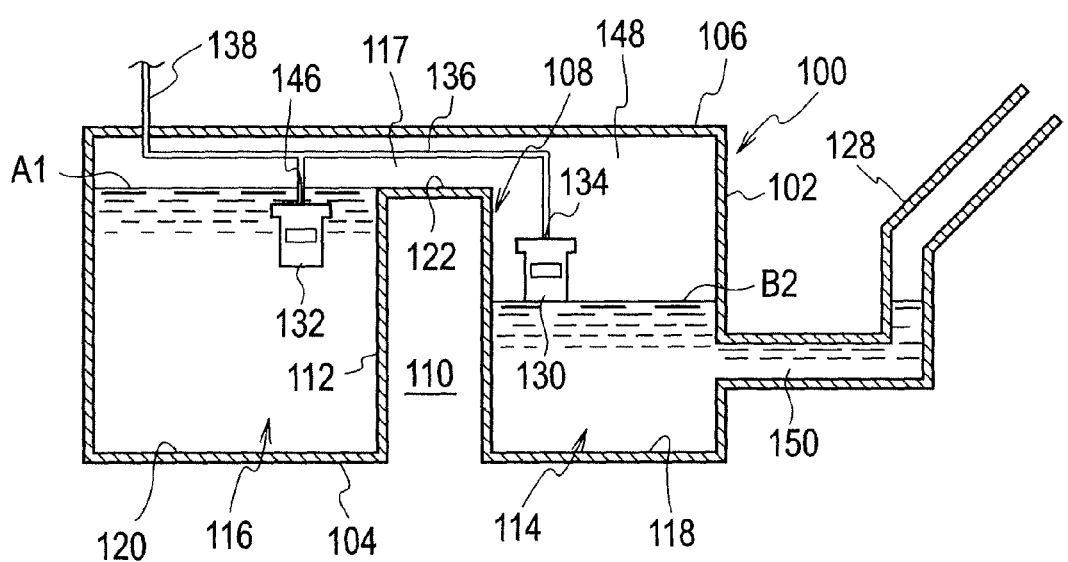
FIG. 7 shows the fuel tank is filled, in which the filling level at which the refueling vent valve in the primary sump is closed has been reached in a refueling procedure in the situation shown in FIG. 6, causing the shut-down of the refueling procedure.

As will be later described, refueling of the fuel tank 100 is possible until both of the refueling vent valves 130 and 132 respond as indicated in the case of FIG. 5 or in the case of FIG. 7. In the case of FIG. 5, the tank fill level or the second predetermined filling level A2 is reached and the fuel tank 100 is filled. Air or vapor dome 148 created between the top 104 and the fuel in the case of FIG. 5 is set to have a predetermined volume. In the case of FIG. 7, the tank fill level or the first predetermined filling level B2 is reached and the fuel tank 100 is filled. A volume of air or vapor dome 148 created in the case of FIG. 7 is equal to or greater than the predetermined volume. In other words, the volume of air or vapor dome 148 is kept greater than the predetermined volume when the fuel tank 100 is filled, avoiding overfilling of the fuel tank 100.

The volume of fuel filling the fuel tank 100 when the tank 100 is filled as shown in FIG. 5 is selected as the prescribed capacity for the tank 100 to contain fuel. As will be described below, the first and second refueling vent valves 130 and 132 are arranged to avoid overfilling of the fuel tank 100 in excess of the prescribed capacity for the tank 100 to contain fuel.

As mentioned before, the first refueling vent valve 130 is closed when the level of fuel in the primary sump 114 is equal to or higher than the first predetermined filling level B2, and the second refueling vent valve 132 is closed when the level of fuel in the secondary sump 116 is equal to or higher than the second predetermined filling level A2. Let it be assumed that a volume of that first space portion of the primary sump 114 which is between the first predetermined filling level B2 and the maximum filling level B1 of the primary sump is V1. Likewise, let it be assumed that a volume of that second space portion of the secondary sump 116 which is between the second predetermined filling level A2 and the maximum filling level A1 of the secondary sump 116 is V2. The shadowed areas illustrated in FIG. 3 indicate the volumes V1 and V2. In order to avoid overfilling of the saddle fuel tank 100 in excess of the prescribed capacity, it is preferred that the first and second refueling vent valves 130 and 132 are arranged in such a manner as to maintain the relation that the volume V1 is equal to the volume V2 (V1=V2) or the relation that the volume V1 is greater than the volume V2 (V1>V2). The present invention, however, is not limited to this relation that the volume V1 is equal to or greater than the volume V2 (V1≧V2) because, in the case of FIG. 7, the maximum filling level A1 is not always reached in the secondary sump 116. If, in the case of FIG. 7, the level of fuel in the secondary sump 116 is lower than the maximum filling level A1 but higher than the second predetermined filling level A2, the volume V1 may be less than the volume V2 as long as the volume V1 is equal to or greater than a volume of fuel that occupies that space portion of the secondary sump 116 which is between the level of fuel lower than the maximum filling level A1 and the second predetermined filling level A2.

Consideration will now be given to the fuel tank 100 in a situation in which both of the primary and secondary sumps 114 and 116 are empty. Fuel indicated at 150 enters the primary sump 114 from the tank filler pipe 128 in a refueling procedure, initiating filling of the primary sump 114. When the level of fuel 150 reaches the first predetermined filling level B2, the first refueling vent valve 130 is closed, but the second refueling vent valve 132 remains open.

Figure 4:
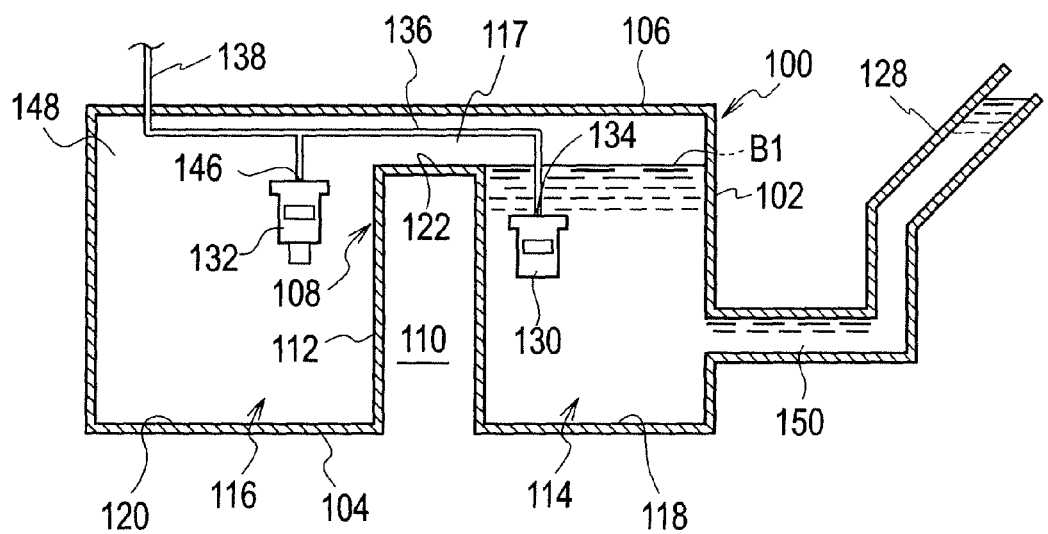
FIG. 4 is a schematic view of the fuel tank of FIG. 3 showing a situation in which the maximum filling level has been reached in the primary sump during a refueling procedure.

Because the second refueling vent valve 132 is open, the level of fuel 150 exceeds the first predetermined filling level B2. Reference will now be made particularly to FIG. 4 showing the fuel tank 100 in the course of the refueling procedure in a situation in which the level of fuel 150 in the primary sump 114 reaches the maximum filling level B1. In this situation, the fuel 150 begins to flow over the top of the riser 112 into the secondary sump 116. When the level of fuel 150 reaches the second predetermined filling level A2, the second refueling vent valve 132 is closed. When both of the first and second refueling vent valves 130 and 132 have been closed, the fuel tank 100 is no longer vented through the outwardly extending conduit 138. As a result, referring to FIG. 5 showing the fuel tank 100 in a tank fill situation, an increased pressure builds up in the air or vapor dome 148 in the fuel tank 100 and causes shut-off of the refueling operation. As shown in FIG. 5, a volume of air or vapor dome 148 created in the fuel tank 100 in this situation is regarded as the prescribed capacity for the fuel tank 100 to contain air needed to maintain the prescribed capacity for the fuel tank 100 to contain fuel 150. It is necessary to maintain the prescribed capacity for the fuel tank to contain air to avoid overfilling of the fuel tank 100 in excess of the prescribed capacity for the fuel tank 100 to contain fuel 150.

Figure 6:
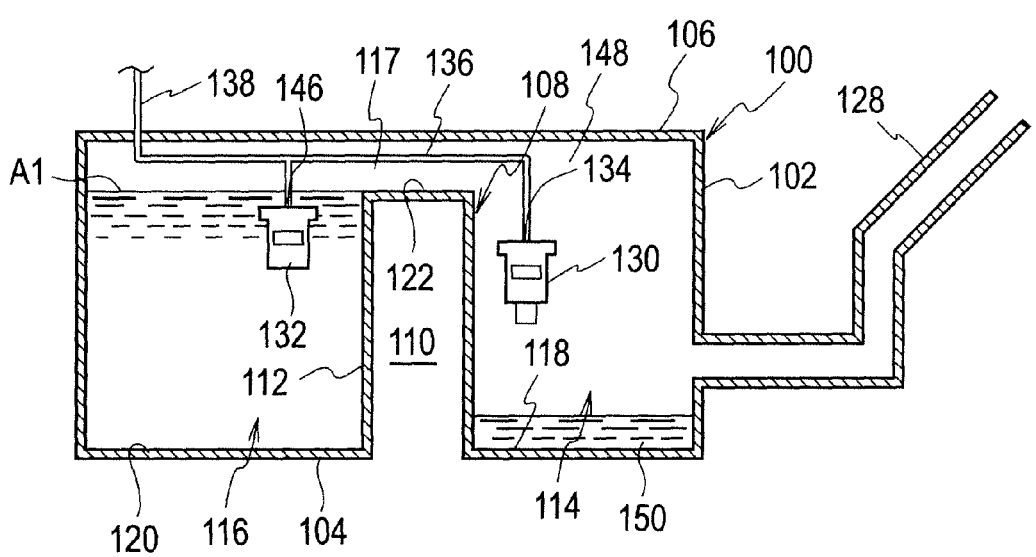
FIG. 6 shows a situation in which, for example immediately prior to a refueling procedure, a relatively large amount of fuel has passed into the secondary sump of the fuel tank to reach the maximum filling level of the secondary sump due to transverse acceleration acting on a motor vehicle.

From this tank fill situation shown in FIG. 5, the secondary sump 116 is first to be consumed during engine operation. Incidentally, it is quite possible for fuel 150 to flow from the primary sump 114 over the top of the riser 112 into the secondary sump 116 when the motor vehicle in which the fuel tank 100 is fitted is subjected to transverse acceleration during traveling in bends of a road. Reference will be made to FIG. 6 showing the fuel tank 100 in a situation in which the level of fuel 150 in the secondary sump 116 is high enough to close the second refueling vent valve 132 after inflow of fuel 150 from the primary sump 114 under the influence of transverse acceleration. In the situation shown in FIG. 6, the maximum filling level A1 has been reached in the secondary sump 116. Even in this situation in which the second refueling vent valve 132 is closed, as long as the first refueling vent valve 130 is open, it is possible to introduce fuel 150 from the tank filler pipe 128 into the primary sump 114 in a refueling procedure because the first refueling vent valve 130 can carry out the venting of the fuel tank 100 through the outwardly extending conduit 138.

Reference will be made to a tank fill situation shown in FIG. 7 in which the refueling procedure ends when the level of fuel 150 in the primary sump 114 reaches the predetermined filling level B2 at which the first refueling vent valve 130 is closed. A volume of the air or vapor dome 148 in this tank fill situation does not drop below the before-mentioned prescribed capacity for the fuel tank 100 to contain air because the first and second refueling vent valves 130 and 132 are arranged to avoid overfilling of the fuel tank 100 in excess of the prescribed capacity for the fuel tank 100 to contain fuel. Because overfilling of the fuel tank 100 is avoided in the tank fill situation shown in FIG. 7 as well as in the tank fill situation shown in FIG. 5, it is possible to protect the storage canister 140.

Figure 2:
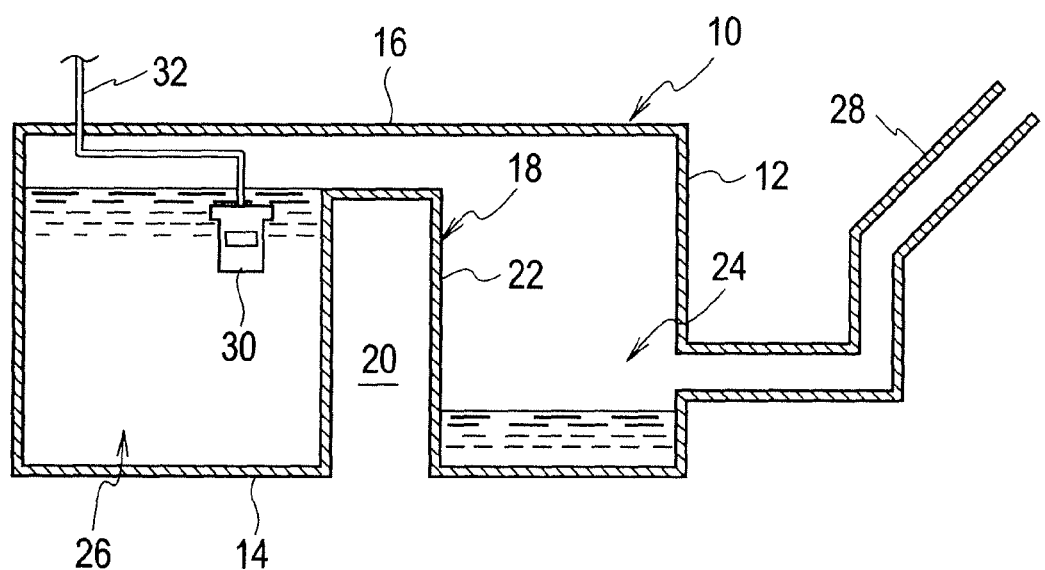
FIG. 2 shows a situation in which, for example immediately prior to a refueling procedure, a relatively large amount of fuel has passed into a secondary sump of the fuel tank of FIG. 1 to reach the maximum filling level of the secondary sump due to transverse acceleration acting on a motor vehicle, making the refueling procedure impossible to start.
Figure 3:
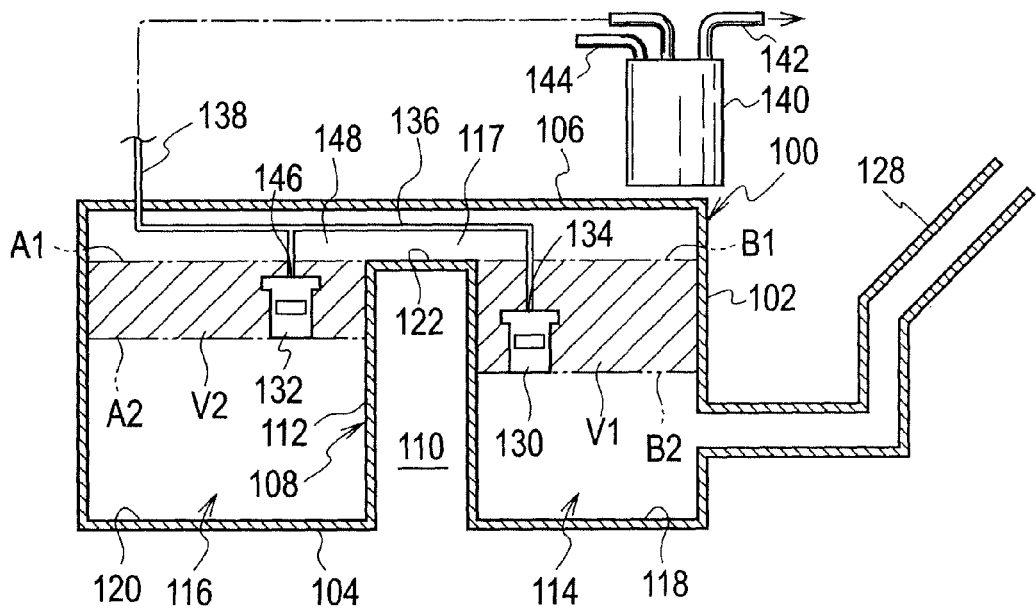
FIG. 3 is a schematic view of a fuel tank showing the maximum filling level of each of primary and secondary sumps of the fuel tank as well as a filling level at which a refueling vent valve in the sump is closed.

Brief comparison to the before mentioned saddle fuel tank 10 will be made. Reference will be made to FIG. 2 showing the fuel tank 10 in a situation in which the level of fuel in the secondary sump 26 is high enough to close the refueling vent valve 30 after inflow of fuel from the primary sump 24 under the influence of transverse acceleration which the vehicle is subjected to. In the situation shown in FIG. 1, the maximum filling level A1 has been reached in the secondary sump 26. In this situation in which the refueling vent valve 30 is closed, it is impossible to introduce fuel from the tank filler pipe 28 into the primary sump 26 in a refueling procedure because the refueling vent valve 30 cannot carry out the venting of the fuel tank 10 through the outwardly extending conduit 32. According to the illustrated embodiment, even in such situation, it is possible to introduce fuel into the primary sump 114 in a refueling procedure because the first and second refueling vent valves 130 and 132 are disposed within the fuel tank 100.

Although the present invention has hereinabove been described with the illustrated embodiment, it will be understood that the present invention is capable of modification and variation and is limited only by the following claims.

What is claimed is:

1. A fuel tank comprising:
   a tank shell having a bottom and a bight in the bottom, the bight providing a riser within an interior of the fuel tank, the riser creating a primary sump and a secondary sump, the primary and secondary sumps conjoining in a space of the fuel tank higher than the riser;
   a first vent valve venting the fuel tank, the first vent valve being configured to be closed when a level of fuel in the primary sump is equal to or higher than a first predetermined filling level that is lower than the riser; and
   a second vent valve venting the fuel tank, the second vent valve being configured to be closed when a level of fuel in the secondary sump is equal to or higher than a second predetermined filling level that is lower than the riser,
   wherein the first and second vent valves are arranged such that a volume of air or vapor dome within the fuel tank when full is equal to or greater than a prescribed volume of air or vapor dome needed to maintain a prescribed capacity of the fuel tank when full.

2. The fuel tank as claimed in claim 1, wherein a volume of a first space portion of the primary sump which is between the first predetermined filling level and a maximum filling level of the primary sump is equal to or greater than a volume of a second space portion of the secondary sump which is between the second predetermined filling level and a maximum filling level of the secondary sump.

3. The fuel tank as claimed in claim 1, wherein the first vent valve is disposed in the primary sump and the second vent valve is disposed in the secondary sump.

4. The fuel tank as claimed in claim 1, including a tank filler pipe providing an entry for fuel into the primary sump.

5. The fuel tank as claimed in claim 4, wherein the fuel tank is configured such that, in a refueling procedure, the fuel tank is filled upon the level of fuel in the secondary sump reaching the second predetermined filling level when the level of fuel in the primary sump is at a maximum filling level of the primary sump.

6. The fuel tank as claimed in claim 5, wherein the fuel tank is configured such that, in a refueling procedure, the fuel tank is filled upon the level of fuel in the primary sump reaching the first predetermined filling level when the level of fuel in the secondary sump is equal to or higher than the second predetermined filling level.

7. A system for controlling filling of a fuel tank in a refueling procedure, the fuel tank having a primary sump, a secondary sump and a bottom configured to a plurality of levels, the system comprising:
   a first refueling vent valve having an outlet, the first refueling vent valve being disposed within the fuel tank and configured to respond by taking a closed position when a level of fuel in the primary sump on a first of the plurality of levels of the bottom is equal to or higher than a first predetermined filling level that is lower than a highest of the plurality of levels of the bottom;
   a second refueling vent valve having an outlet, the second refueling vent valve being disposed within the fuel tank and configured to respond by taking a closed position when a level of fuel in the secondary sump on a second of the plurality of levels of the bottom is equal to or higher than a second predetermined filling level that is lower than the highest of the plurality of levels of the bottom; and
   a conduit connecting the outlet of the first refueling vent valve and the outlet of the second refueling vent valve, the conduit passing over the highest of the plurality of levels of the bottom,
   wherein the first and second refueling vent valves are arranged such that a volume of air or vapor dome with in the fuel tank when full is equal to or greater than a prescribed volume of air or vapor dome needed to maintain a prescribed capacity of the fuel tank when full.

8. The system as claimed in claim 7, wherein the first predetermined filling level is different from the second predetermined filling level.

9. The system as claimed in claim 7, wherein the first and second refueling vent valves are float operated.

10. The system as claimed in claim 7, wherein the bottom of the fuel tank has a saddle-like configuration.

11. A method of controlling filling of a fuel tank in a refueling procedure, the fuel tank having a primary sump, a secondary sump and a bottom configured to a plurality of levels having a riser, the method comprising:
    disposing a first refueling vent valve, having an outlet, within the fuel tank to respond by taking a closed position when a level of fuel in the primary sump on a first of the plurality of levels of the bottom is equal to or higher than a first predetermined filling level that is lower than the riser;
    disposing a second refueling vent valve, having an outlet, within the fuel tank to respond by taking a closed position when a level of fuel in the secondary sump on a second of the plurality of levels of the bottom is equal to or higher than a second predetermined filling level that is lower than the riser; and
    disposing a conduit connecting the outlet of the first refueling vent valve and the outlet of the second refueling vent valve over a highest of the plurality of levels of the bottom,
    wherein the first and second refueling vent valves are arranged such that a volume of air or vapor dome within the fuel tank when full is equal to or greater than a prescribed volume of air or vapor dome needed to maintain a prescribed capacity of the fuel tank when full.

12. The method as claimed in claim 11, wherein the first and second predetermined filling levels are lower than the highest of the plurality of levels of the bottom.

13. The method as claimed in claim 12, wherein a volume of a first space portion of the primary sump which is between the first predetermined filling level and the highest of the plurality of levels of the bottom is equal to or greater than a volume of a second space portion of the secondary sump which is between the second predetermined filling level and the highest of the plurality of levels of the bottom.

14. The method as claimed in claim 13, wherein the step of disposing the first refueling vent valve includes disposing the first refueling vent valve in the primary sump and the step of disposing the second refueling vent valve includes disposing the second refueling vent valve in the secondary sump.

* * * * *